Jan. 9, 1951  F. S. LAPEYRE ET AL  2,537,355
MACHINE FOR PEELING SHRIMP
Filed Dec. 9, 1947  5 Sheets-Sheet 5
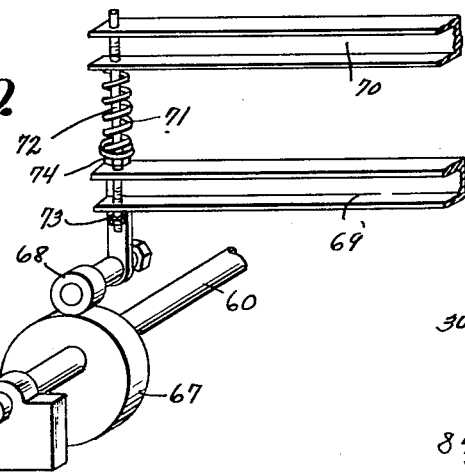
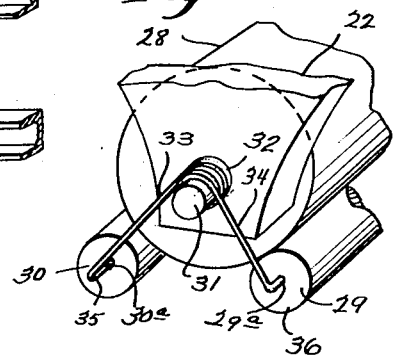
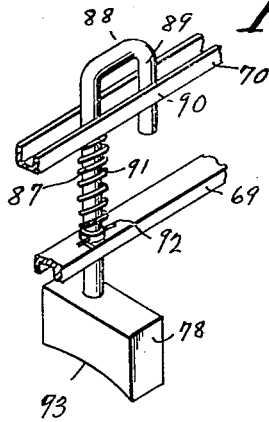
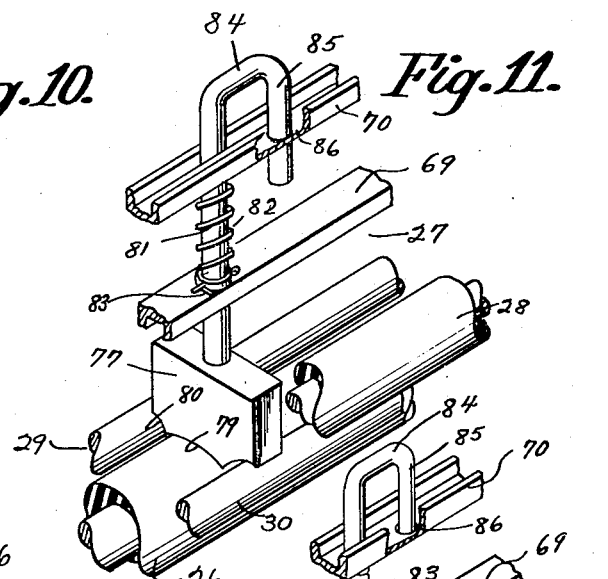
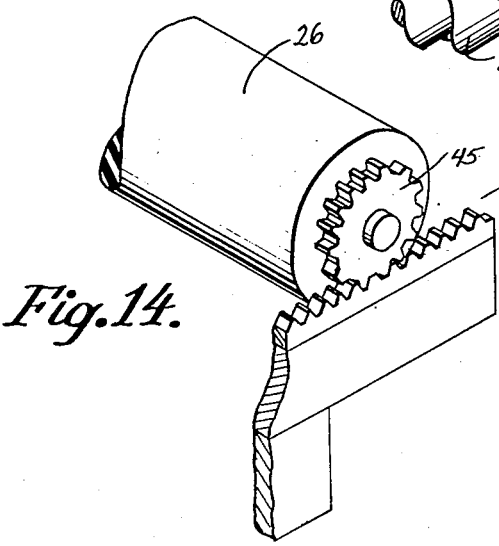
INVENTOR.
FERNAND S. LAPEYRE
JAMES M. LAPEYRE, III
EMILE M. LAPEYRE
By Wilkinson & Mawhinney
ATTORNEYS Patented Jan. 9, 1951

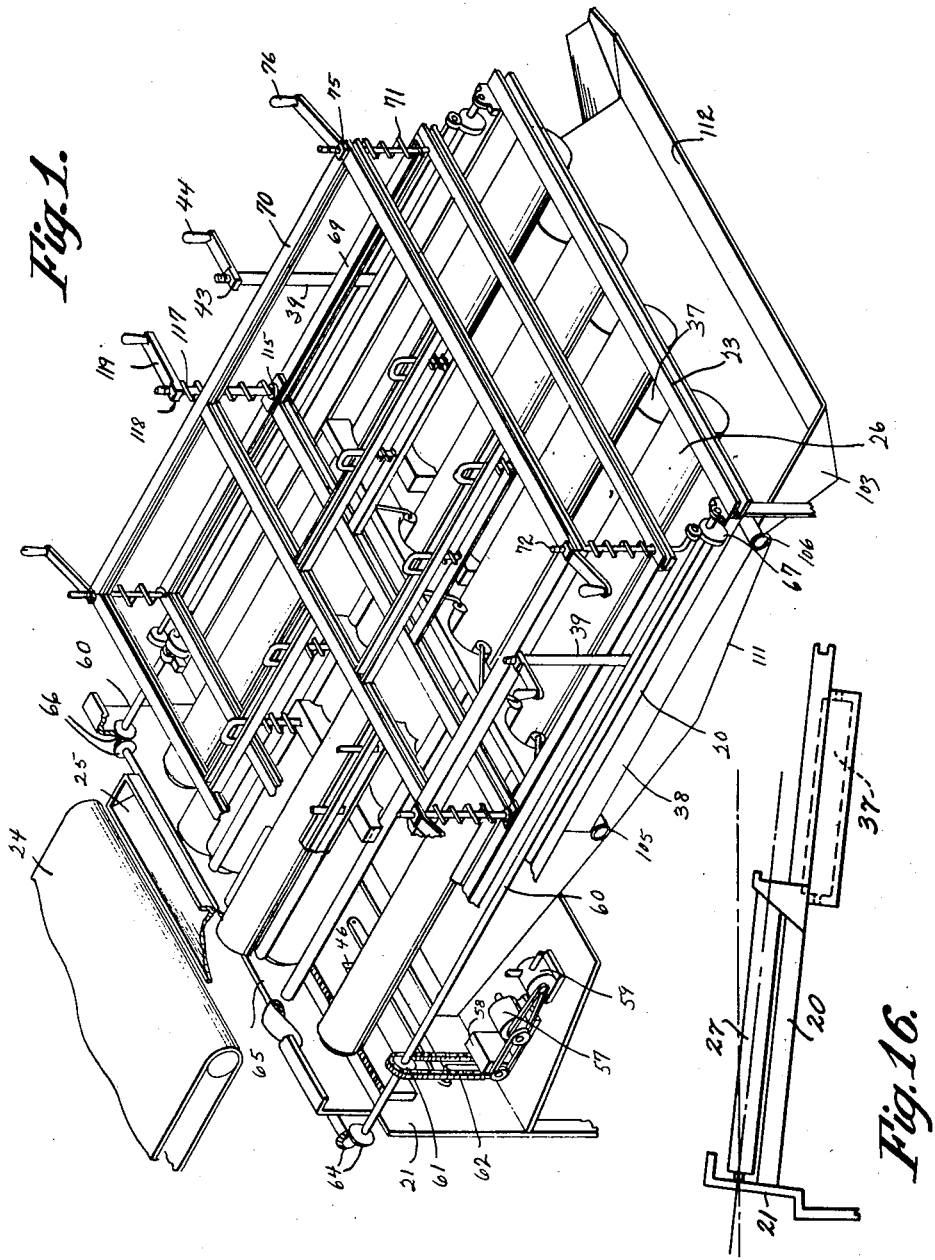

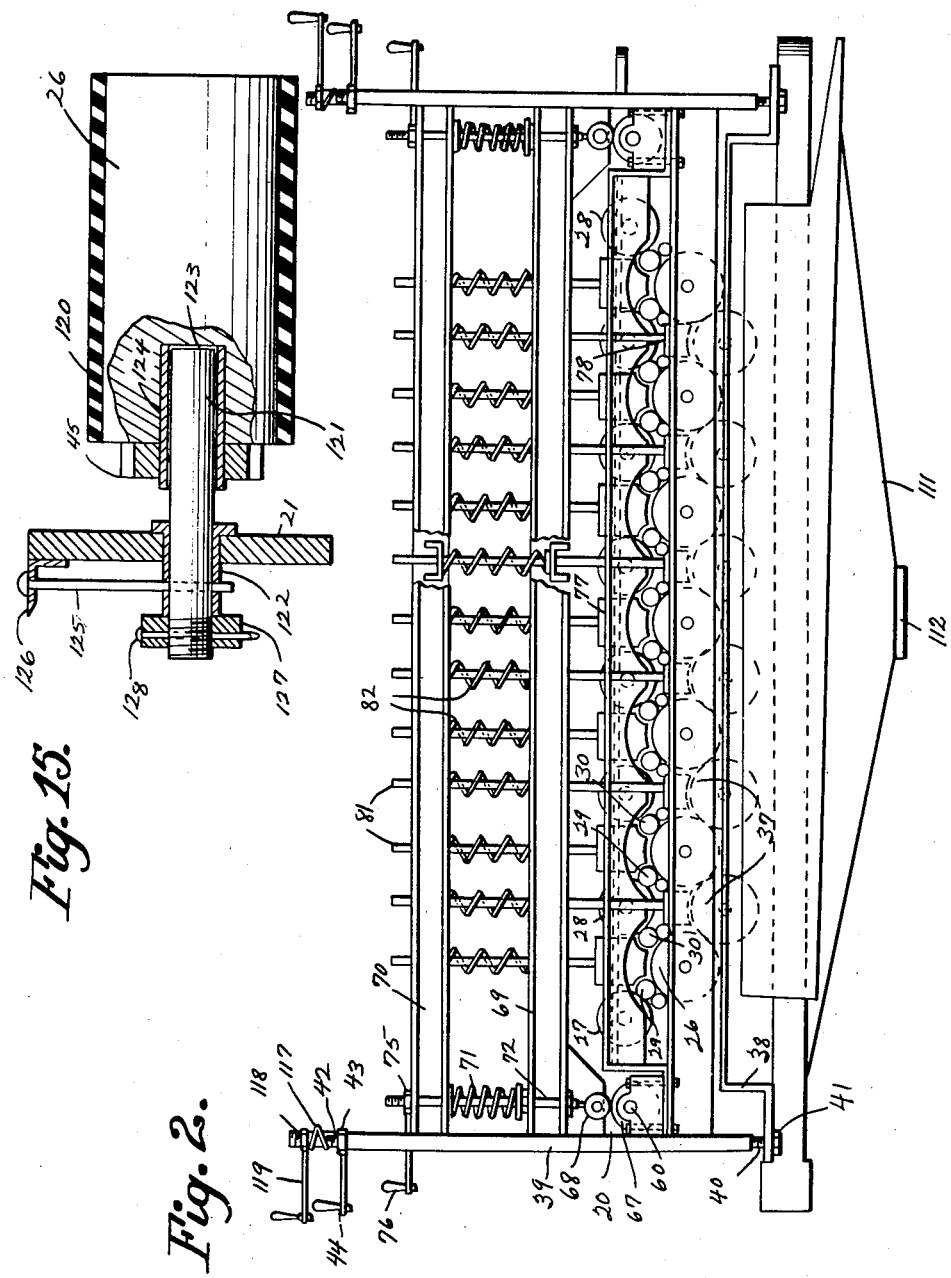

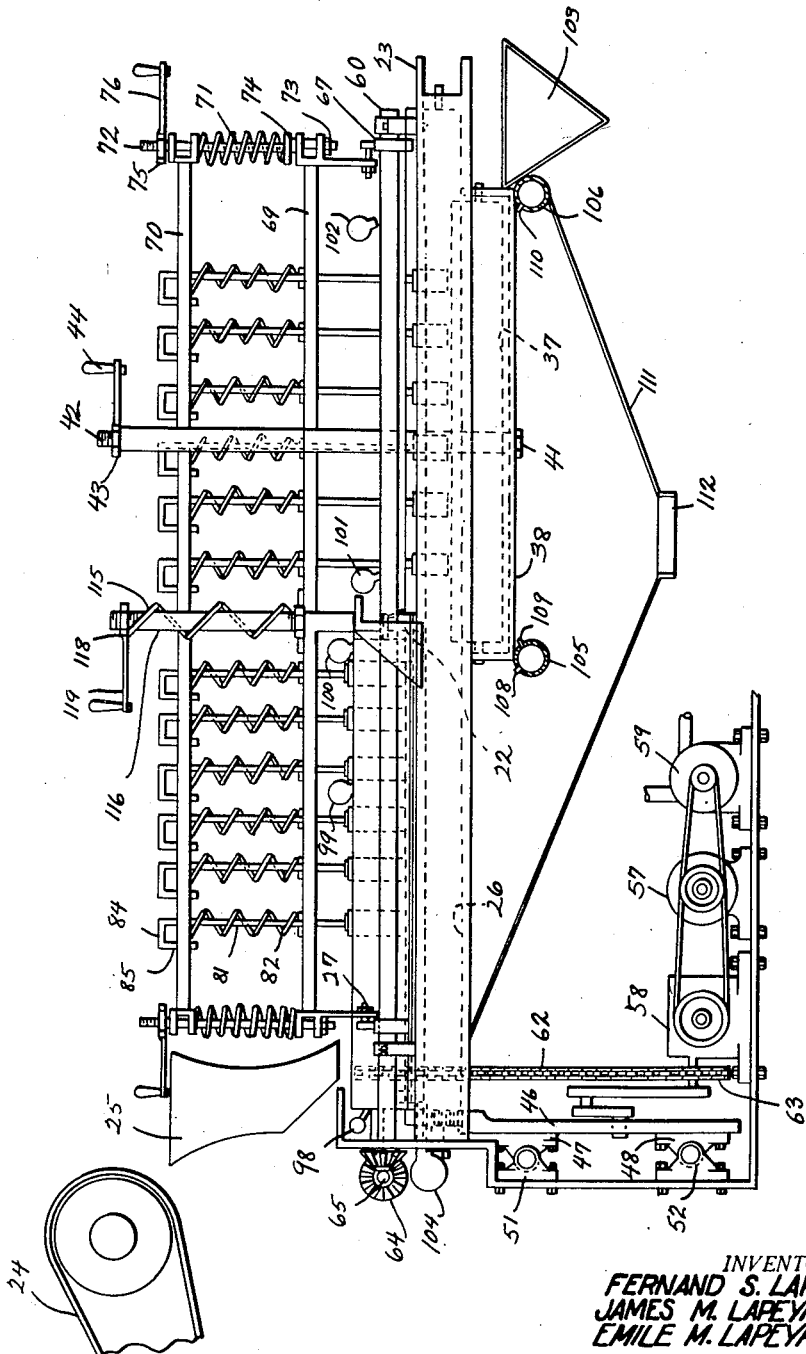

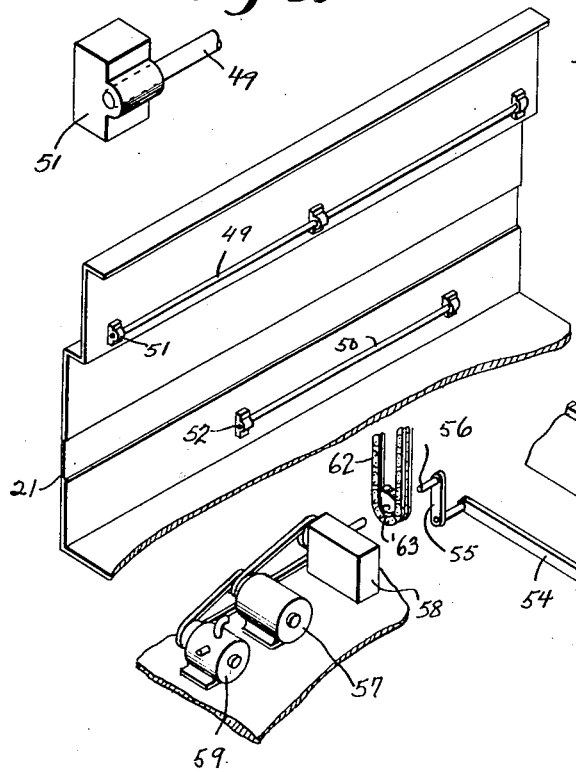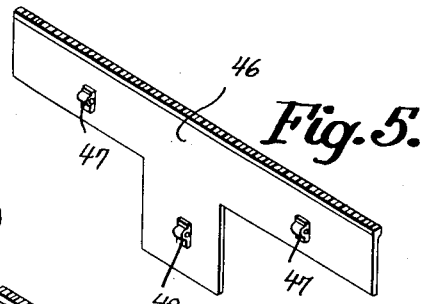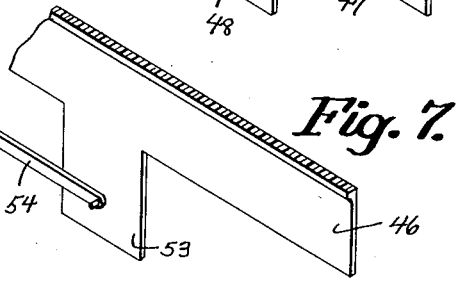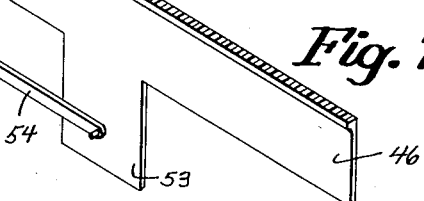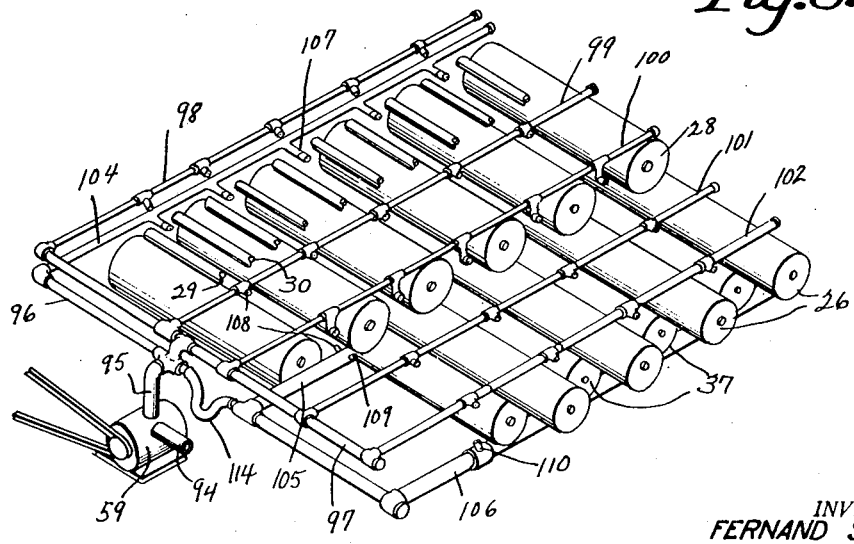

2,537,355

UNITED STATES PATENT OFFICE 2,537,355

MACHINE FOR PEELING SHRIMP

Fernand S. Lapeyre, New Orleans, and James M. Lapeyre, III, and Emile M. Lapeyre, Houma, La., assignors to Peelers, Incorporated, Houma, La., a corporation of Louisiana Application December 9, 1947, Serial No. 790,660

19 Claims. (Cl. 17—2)

The present invention relates to improvements in machines for peeling shrimp and consists generally in certain improvements over prior machines as illustrated in Patent 2,429,828, granted October 28, 1947.

While the present invention has, in general, the same objects and purposes as stated in the patent and copending application aforesaid, the machine according to the present invention offers comparative advantages in speed, precision and efficiency of peeling, as well as in achieving a higher yield of peeled meats by weight from a given weight of unpeeled shrimp. This superior result is achieved by exerting a degree of pressure upon the shrimp to maintain them in the crotch of the rollers, and by the utilization of two different combinations of rollers in the one machine.

Experience has shown that although superior peeling action is achieved by use of large rollers, the initial use of large rollers results in a degree of mutilation of the meats. The use of small rollers, on the other hand, while it eliminates substantially all mutilation, does not, in all cases, effect an efficient and complete peeling job. It has been found, however, that if shrimp are initially subjected to partial peeling by smaller rollers and then subjected to further peeling by larger rollers, a complete peeling job is achieved without appreciable mutilation of the meats. The explanation of these findings is that small rollers peel hulls from shrimp by an "unwrapping" action, whereas large rollers peel by a "pinching" action. In other words, when small rollers are used, a shrimp, if it is peeled at all, is peeled by one edge of the hull being drawn through the crotch of the rollers, thereby exposing the shrimp by an unwrapping action, much as tape is drawn from a spool. Larger rollers, on the other hand, because of the greater angle of attack, will grab the hull generally at the back and expose the meat by pinching same out of the hull as the hull passes through the crotch of the rollers.

When shrimp are first exposed to peeling by small rollers, the tail section and other small appendages of the shrimp are usually removed and the hull, as a whole, is loosened or broken, if not entirely removed. When these partially peeled shrimp are subsequently exposed to peeling by large rollers, a complete peeling job is achieved without the mutilation that would have been caused had the shrimp been initially exposed to the large rollers. That is due to the fact that the hulls, having been broken or loosened by an unwrapping action, the hulls are more easily and readily pinched from the meats.

Observation has further shown that even when small rollers are used, the tail sections of shrimp are removed by pinching action just as in the case of use of large rollers. However, when large rollers are initially used, the pinching on the tail section is so violent that mutilation may occur. When small rollers are used, the smaller angle of attack causes removal of the tail by pinching action without appreciable mutilation.

Experience has further shown that when a degree of pressure is exerted upon the shrimp to keep it in the crotch of the roller as they travel along a roller channel, a complete peeling job is assisted.

These findings have been utilized in the new machine, which is composed of two sections, an upper section, wherein the shrimp are exposed to peeling by small rollers, and a lower section in which the shrimp, already partially peeled in the upper section, are exposed to complete peeling by relatively large rollers. In both sections of the machine, pressure fingers are employed for the purpose of keeping the shrimp in the crotch of the rollers and thereby assisting in a complete peeling job.

With the foregoing and other objects in view, the invention will be more fully described hereinafter and more particularly pointed out in the appended claims.

In the drawings, in which like parts are denoted by the same reference characters throughout the several views, Figure 1 is a perspective view of a simplified form of machine for peeling shrimp, constructed in accordance with the present invention and omitting certain parts for clearness;

Figure 2 is a front elevational view of a larger form of the improved shrimp peeling machine;

Figure 3 is a side elevational view, with parts shown in section, of the machine of Figure 2;

Figure 4 is a fragmentary isometric view of the upper end wall of the machine showing the mounting for the reciprocating rack for driving the power rollers;

Figure 5 is an isometric view of the reciprocating rack from the rear or inside face thereof showing the bearings;

Figure 6 is an enlarged perspective view of a form of bearing employed with the supporting shaft engaged thereon and partly broken away;

Figure 7 is an isometric fragmentary view of the rack taken from its front face and showing the drive mechanism therefor;

Figure 8 is a simplified fragmentary perspective view illustrating the arrangement of liquid supply lines located on the upper and lower sections of said machine;

Figure 9 is a perspective view showing cam actuating mechanism for reciprocating the pressure finger frames with parts broken away and with parts shown in section;

Figure 10 is a fragmentary perspective view of the lower section of the pressure finger frame illustrating a finger and its mounting;

Figure 11 is an enlarged fragmentary perspective view of a portion of the upper section of the machine showing the application of a pressure finger and its mounting;

Figure 12 is a view similar to Figure 11 with a pressure finger shown as raised relatively to its frame;

Figure 13 is an enlarged fragmentary perspective view of the mid-abutment showing coil spring attachment for the securing of insert rollers;

Figure 14 is an enlarged fragmentary perspective view of a single power roller gear in relation to the roller and the reciprocating rack; and Figure 15 is a fragmentary longitudinal section taken through one of the rollers showing a form of bearing support.

Figure 16 is a diagrammatic view showing the slanted or inclined position of the rollers and channels.

Referring more particularly to the drawings, 20 designates generally the rigid framework of the machine, 21 the rear wall of the machine, 22 a transverse beam or mid-abutment which divides the machine generally into a first or upper peeling section and a second or lower peeling section, and 23 represents a transverse beam at the lower or front end of the machine.

The shrimp to be peeled may be delivered to the machine through any appropriate agency, for instance by an endless conveyor 24 which delivers the shrimp to a hopper or guide trough 25 which is situated just forwardly of the rear vertical wall 21 and above the higher ends of the channels which are formed between the rollers as hereinafter described.

The channels in the first or upper section of the machine are formed by groups or associations of five rollers to the unit, and as many units as desired may be repeated transversely across the machine to provide a machine having a desired peeling capacity.

This association of rollers is best seen in Figures 2 and 11 and comprises a power roller 26 which forms the base of the channel, two channel forming rollers 27 and 28 which are mounted at a higher elevation than the power base roller 26 and spaced apart horizontally to the sides of such power roller; and insert rollers 29 and 30 mounted respectively between the power roller 26 and the channel forming rollers 27 and 28.

Each of these five rollers is provided with integral bearings within its extremities, the bearings and rollers rotating as one. The power roller and upper channel rollers are fixedly mounted on removable and non-rotating shafts, projecting from the framework, and each insert is mounted on a flexible spring at each end thereof to maintain the insert in contact with the power roller and abutting channel forming roller. The power rollers 26 are sufficiently long to extend substantially the full length of the machine and extend in common to both the first and second peeling sections of the machine. Such power rollers 26 may be supported from the back wall 21 and the front transverse beam 23. All of the rollers preferably incline forwardly and downwardly from the back wall 21 to the front beam 23 although an inclination is not essential inasmuch as the shrimp may be compelled to travel down the channels under the impelling action of a forceful water stream as hereinafter explained.

The channel forming rollers 27 and 28 and the insert rollers 29 and 30 are relatively shorter in length compared with the power rollers 26 and such rollers 27, 28, 29 and 30 extend only the length of the first or upper peeling section of the machine and may be mounted from the back wall 21 and from the mid-abutment beam 22.

The power rollers 26 and the channel forming rollers 27 and 28 may, and preferably do, all have fixed locations and they may be all of a diameter which, although not necessarily the same, is large in comparison with the diameters of the insert rollers 29 and 30. The power rollers 26 and the channel forming rollers 27 and 28 are so relatively mounted that their peripheries are separated a distance at their nearest points which is somewhat less than the diameters of the insert rollers 29 and 30. This is for the purpose of enabling the insert rollers 29 and 30 which are not fixedly mounted but are resiliently supported, as shown in Figure 13, to be forcibly urged constantly by spring pressure into the restricted throats between the power rollers 26 and the channel forming rollers 27 and 28; this for a two-fold purpose, namely, in the first place of supplying a high degree of frictional contact between each power roller 26, the insert rollers 29 and 30 and their respective idler channel forming rollers 27 and 28. In this way both the insert rollers and the channel forming rollers are driven from the power rollers 26. In the second place, the spring pressure to which the insert rollers 29 and 30 is subjected provides a tight nip or bight between such insert rollers and the power roller 26 and respective channel forming rollers 27 and 28; this tight nip being desirable for promoting the highest efficiency in the "unwrapping" action upon the shrimp as hereinafter explained.

Viewing the apparatus from the aspect of Figure 2, seven power rollers 26 are shown as mounted across the breadth of the machine in horizontally spaced and substantially parallel relation; and eight of the channel forming rollers 27 and 28 are illustrated, it being understood that the channel forming roller 28 of the first channel on the left serves also as a channel roller for the next channel. In other words all except the end channel rollers 27 and 28 serve as to opposite sides thereof as channel forming rollers for adjacent parallel channels.

Referring to Figure 13, an intermediate channel roller 28 is indicated as mounted at one end in the mid-abutment 22 with its journal 31 projecting to the opposite or lower side of the mid-abutment 22 where the same conveniently receives a coil spring 32 having resilient arms 33 and 34 thereof extending down diagonally or in divergent relation and having the right angularly turned ends 35 and 36 thereof seated in axial sockets 30ᵃ and 29ᵃ of the rollers 30 and 29. A like spring supporting construction supports the upper ends of the insert rollers. The spring arms 33 and 34 are biased by the inherent resiliency of the helix 32 of which they are parts to tend to move together and consequently to tend to draw the insert rollers 30 and 29 together.

Again viewing the apparatus as shown in Figure 2, it will be seen that disregarding the end insert rollers 29 and 30 the remaining insert rollers are thus connected in pairs by the spring arms 33 and 34 and are urged thereby into the constricted throats in adjacent channels. The end rollers 29 and 30 are similarly mounted on single arm springs.

The second or lower peeling section of the machine is formed by the same power rollers 26 together with base idler rollers 37 which, as shown in Figure 3, are mounted from sub-frame 38. From Figure 3 it will be observed that the rear or left ends of the base rollers 37 underlap the mid-abutment beam 22 and the lower ends of the channels of the first or upper section, while the front or right-hand ends of the base rollers 37 terminate short of the lower ends of the power rollers 26.

Again viewing Figure 2, it will be seen that two of the power rollers 26 and an associated base roller 37 together combine in a substantially inverted triangular relation with the base roller 37 forming the base of a channel defined laterally by adjacent horizontally spaced power rollers 26 with the channels of the lower or second section being offset laterally from the channels of the first or upper section of the machine. The power rollers 26 rotate in friction contact with the peripheries of the base rollers 37 to thereby impart rotation thereto.

For the purpose of adjusting the friction contact between these rollers, the sub-frame 38 carrying the base rollers 37 is vertically movable. One form of adjustment may consist of vertical sleeves 39 welded or otherwise fixedly secured to the main machine frame 20. Rods 40 slidable in said sleeves have lower heads 41 or other means of rigid connection to the sub-frame 38. The upper ends of the rods which project above the sleeves are screw threaded as indicated at 42 and receive thereon nuts 43 which rest upon the upper ends of the fixed sleeves 39. For convenience in rotation the nuts have handles 44 outstanding therefrom. By rotating the nuts 43 in a clockwise direction as viewed from the top of the shafts 40, such shafts 40 with the sub-frame 38 will be raised thus elevating the base rollers 37 into a more forcible friction contact with the adjacent power rollers 26.

The power rollers are given an oscillating movement through a desired angular degree, for instance one and one-half turns in each direction. Any appropriate actuating mechanism may be employed for this purpose. For instance, as shown in Figures 1 and 14, the power rollers are equipped with pinions 45 which engage a reciprocating toothed rack 46 mounted in the frame or upon the end wall 21 of the machine.

As shown more particularly in Figures 4, 5 and 6, the rack is provided on its rear face with bearings 47 and 48 for slidably supporting the rack upon fixed shafts 49 and 50 carried in appropriate mountings 51 and 52 outstanding from the front face of the rear wall 21. The rack may have a depending arm 53 to which is pivoted one end of a link 54 coupled at its other end to a crank 55 mounted on a shaft 56 driven from an electric or other motor 57 through a reduction gear 58. The motor 57 also drives a liquid pump 59. As the crank 55 rotates, the link 54 will impart to the rack 46 a lateral reciprocating motion. The throw or length of the motion is dependent upon the radius of the crank 55 and upon other considerations which may be varied to give the requisite oscillating motion to the power rollers 26.

The shaft 56 may also be utilized to drive cam shafts 60 which are journaled longitudinally one at each side of the machine. One of the cam shafts has affixed thereon a sprocket 61 (Figures 1 and 3) engaged by an endless chain 62 driven from a sprocket 63 affixed to the shaft 56.

The driven cam shaft 60 which has thereon the sprocket 61 is connected by beveled gears 64 to a transmission shaft 65 mounted upon the rear side of the rear wall 21 or other appropriate part of the frame. At the opposite end of the transmission shaft 65 are other beveled intermeshing gears 66 for communicating motion to the opposite cam shaft 60.

Each cam shaft 60 has a number of rotary cams 67 fixed thereon for receiving thereon rollers 68 or other forms of cam followers. These rollers 68 and the cams may be four or more in number and support and vertically reciprocate a pressure finger frame. This frame comprises a lower rectangular or other form of frame section 69 and an upper similar frame section 70 spaced above the lower section 69. Coil springs 71 are interposed at corner or other desired portions between the two frame sections 69 and 70 for the purpose of yieldably supporting the upper frame section 70 from the lower frame section 69 which latter is directly supported by the rollers 68 on the cams 67.

As shown more particularly in Figures 1 and 9, the coil springs 71 are wound about vertical rods 72, which rods are fixed in the lower frame by nuts 73 and 74 threaded thereon. The rods 72 slide freely through the upper frame 70 and project thereabove, such projecting portions being threaded to receive nuts 75 having outstanding handles 76 to give leverage for convenience in rotating the same. When the nuts 75 are rotated in one direction, the upper frame section 70 will be compelled to descend closer to the lower frame section 69, compressing the springs 71. When the nuts 75 are rotated in the opposite direction, the springs 71 will elevate the upper frame section relatively away from the lower frame section 69.

The reciprocating finger frame receives fingers 77 for the upper section and 78 for the lower peeling section of the machine.

Referring to Figure 11, each finger 77 comprises generally a block of metal or other suitable material so shaped as to fit the channels of the first section. The lower surfaces 79 of the fingers 77 are preferably curved to conform generally to the curvature of the power rollers 26, and cut away portions 80 at the lower side corners of the finger blocks 77 provide clearance for the fingers in and about the insert rollers 29 and 30.

Each finger is carried upon a stem or rod 81 which engages slidably through both frame sections 69 and 70. Light coil springs 82 are wound about the stems 81 between collars 83 fast on the stems and the upper frame section 70. The springs 82 reacting against the upper frame section 70 urge the collars 83 and therefore the fingers 77 downwardly with pressure against the shrimp in the channels; yet at the same time an accumulation of shrimp beneath the edge 79 of a finger 77 will permit the finger to rise relatively to the frame sections 69 and 70, as shown in Figure 12, to prevent breakage of the parts or the mashing or mutilation of the shrimp below the finger 77.

The upper ends of the stems 81 are formed with lateral offsets 84 carrying downturned ends 85 adapted to engage slidably through openings 86 in the upper frame section 70. This arrangement will prevent the rotation of the stems 81 and of the fingers 77 out of alignment and out of a correct position in the channels and with respect to the rollers.

As many of the fingers 77 may be carried in each channel as desired.

The fingers 78, more particularly shown in Figure 10, are similarly carried upon stems 87 having offsets 88 and downturned arms 89 engaged in openings 90 of the upper frame 70, and with coil springs 91 and collars or fixed abutments 92. The fingers 78 are similar to the fingers 77 in that curved lower surfaces 93 are arranged to ride on the base rollers 37 but the lateral cut away portions 80 of the fingers 77 are omitted in the lower case fingers 78 inasmuch as in the lower peeling section the insert rollers 29 and 30 are absent.

The various rollers may be of rubber, or a suitable composition, to give friction contact with the hulls and other parts of the shrimp in a manner to facilitate the grasping of the shrimp by the roller surfaces and in the nips of the rollers.

It is preferred to employ a water flushing system which is shown more particularly in Figure 8 in which the inlet side 94 of the pump 59 is connected to a suitable source of water or other liquid which is circulated by the pump through a discharge pipe 95 to an upper and lower pipe system 96 and 97. The upper system includes transverse pipes 98, 99, 100, 101 and 102 having appropriate discharge nozzles aligned with the channels of the upper and lower sections at appropriate points. For instance, the discharge nozzles of the uppermost pipe 98 are disposed to flush water into the origin or highest ends of the channels of the first section at or about the point where the shrimp drop into the channels from the overhead trough 25. The pipes 99 and 100, as shown in Figure 3, are disposed also above the channels of the first section and have their discharge nozzles pointing downwardly over such channels.

The pipes 101 and 102, as also shown in Figure 3, are disposed above the shrimp channels of the lower or second peeling section of the machine and are intended to wash the peeled meat from the lower ends of the channels at the front of the machine into a laterally inclined meat receiving trough 103 which may deliver at one side of the machine to a receptacle or conveyor for conveying the shrimp to a suitable destination.

The lower system of pipes 96 comprises transverse pipes 104, 105 and 106. The nozzles 107 of the uppermost pipe 104 are elongated to project a stream of water with considerable force beneath the insert rollers 29 and 30 to wash the slime and adherent particles of hull therefrom.

The transverse pipe 105 has two sets of nozzles 108 and 109 situated, as shown in Figure 3, to direct streams of water upwardly beneath the power rollers 26 in the first section and beneath the base rollers 37 in the lower section.

The lowermost pipe 106 has nozzles 110 backwardly projected, as shown in Figure 3, to direct jets of water beneath the lower forward ends of the base rollers 37.

From Figure 3 it will be apparent that the pipes 105 and 106 are carried by the sub-frame 38 and must move up and down with the same. Therefore a length of flexible slack hose 114 is included in the pipe 96 to compensate for this movement.

A pan 111 having convergent front and rear and side walls leading to a central lowermost discharge 112 is carried beneath both peeling sections of the machine to receive the hulls and other matter separated from the meat in the peeling process.

In operation, shrimp are carried by the feeder belt 24 from a tank reservoir (not shown), at a controlled rate, into the guide trough 25, at the introductory end of the upper peeling section. This trough 25 spans all of the channels and distributes the shrimp into the channels or onto the rollers which guide the shrimp into the channels.

The object of the upper peeling section is to loosen the shell, feet and gristle on the shrimp, to unwrap the shells from the meat, to pinch the tail sections, feet and other small appendages, such as whiskers, from meats, and to separate from the peeled and unpeeled meats all non-edible portions as removed.

The object of the lower peeling section is to loosen the remaining shells, feet and gristle from the meats and to pinch the remaining shells, feet and gristle from the meats.

Where the channels are inclined, the inclination and the rolling action will tend to cause the shrimp to move slowly down the channels. This action may be facilitated by the water or other liquid sprays which may be used with or without the inclined structures. Such liquid also tends to wash the rollers clear of slime and particles of the meat or hulls which might adhere to the rollers.

The rollers are given an oscillating motion as heretofore described so that the shrimp are shifted alternately from one side of the channels to the opposite side whereby the shrimp will be presented in constantly changing positions to the nips between the rollers for fresh grips by such rollers in order to afford every opportunity for thorough peeling. The pressure fingers are caused to rise and fall in synchronous frequency with the oscillating motion of the roller. These pressure fingers are adjustably spring loaded as heretofore described and the extreme low position of the pressure fingers is adjustable by adjustment of the cam follower support through the nuts 73 and 74. The action of the cams 67 is timed so that the fingers 77 and 78 rise when the rollers come to a stop during a cycle and the fingers are kept raised until reverse roller rotation has carried the shrimp over to the other side of the channel, at which time the fingers are lowered. The fingers are formed to the approximate contour of the channels and may be of any suitable thickness and spacing.

Liquid from the supply line 100 forces the shrimp from the upper peeling section into the lower peeling section of the machine.

The power rollers 23 extend to both the upper and lower peeling sections of the machine. These rollers are the bottom rollers in the upper section and the top rollers in the lower section.

The shrimp thus progresses down the channels of both sections under the action of gravity where the machine is inclined and under the propelling force of the water stream, being moved from one side of the channels to the other by the reversal of rotation of the rollers and being subjected to peeling action at both sides of the channels and in both sections of the machine, the hulls being drawn through the nips of the rollers and deposited in the pan 111 below the machine, while the meat is rejected at the nips and is caused to move all the way down the channels and be finally delivered to the transverse trough 103.

The machine efficiently accomplishes the loosening of the shell, feet and gristle on the underside of the head section of shrimp by having such shrimp held under proper pressure by the pressure fingers against moving surfaces such as the rollers. The proper pressure is applied by the fingers under tension against the shrimp. The fingers hold the shrimp against the rollers.

A regulatory action of the loosening action on the shell, feet and gristle is achieved by changing the degree of force with which the fingers act to hold the shrimp against the moving surfaces of the rollers. Such degree of force may be changed by adjusting the spring tension on the fingers. This is done by rotating the handles 76 and the nuts 75.

The machine accomplishes the unwrapping of the hulls from the shrimp meat, that is the withdrawing of the hull, either in whole or in part, by causing only one side of the shell along its edge, on the underside of the shrimp, to be caught in the rollers so that the pulling action of the rollers serves to draw the hull from the meat much as tape is unwrapped from a spool. As this unwrapping action occurs, the meat turns or revolves and the removal of the hull is accomplished without mutilation of the meats. This action is obtained in the upper section by the use of the small diameter insert rollers 29 and 30. It has been found that if one of the rollers in a combination of rollers is of sufficiently small diameter for the shrimp to enter closely to the line of contact of the rollers the edge of the hull can be grasped and the hull drawn from the meat without mutilation, regardless of the diameter size of the other roller or rollers used in combination with the small diameter roller. The small diameter insert rollers 29 and 30 employed in the upper peeling section in conjunction with the large diameter power-driven rollers 26 effectively achieve the unwrapping action referred to. Also in the upper section, the small tail sections of the hull, the feet and other small appendages of the shrimp are afforded every opportunity of reaching sufficiently into the crotch or bight between the small diameter and large diameter rollers as to be grasped and pulled through the rollers. This object and purpose is furthered by the fact that the pressure fingers hold the shrimp in firm contact with the crotch portions of the rollers.

The machine also secures to a high degree the pinching of the hulls and gristle from the meats by the grasping action of large rollers. This action is secured principally in the lower peeling section by the use of large diameter rollers 26 and 37. Such large diameter rollers have a more gradual angle of attack on the shrimp in the crotch. This action is also furthered by use of the pressure fingers in holding the shrimp firmly in the working crotches of the rollers by adjustable tension.

The machine also accomplishes the separation of the hulls, feet and gristle from the edible meats. This is accomplished after peeling, or simultaneously with peeling, by the pulling action of the rollers on the hard surfaces of the non-edible parts of the shrimp, causing them to pass through, and beyond, the line of contact of the rollers, while the edible meats, which are of a slippery nature, remain on the same side of the line of contact as introduced.

The machine is constructed and arranged to maintain traction of the rollers at all times so as to preserve their gripping power on the hulls, feet and tail sections by removing slime which would interfere with such action. Any suitable liquid, such as water, may be used in proper quantities for flushing the moving surfaces free of such slime.

The machine automatically controls the rate of shrimp advance and by such control regulates the amount of work done on the shrimp so as to prevent loss of machine efficiency through unnecessary work on the shrimp, and yet insures the amount of work necessary to complete the peeling job. A regulated volume of flushing liquid on the upper sides of the rollers achieves this objective.

The rate of shrimp advance through the machine may also be controlled by the adjustment of the angle of inclination at which the channels are set. It has been found that angles of the order of ten to twelve degrees will be of assistance in promoting advancement of the shrimp along the channels. However the channels may be horizontal throughout if the flow of liquid on the upper sides of the rollers is increased.

A third method of regulating the rate of advance of the shrimp through the machine is by the timing of the pressure fingers employed to hold the shrimp in the crotches of the rollers. During the intervals that the shrimp are held under pressure by the fingers, they cannot move along the channels, regardless of the quantity of liquid used for flushing the shrimp along the channels and regardless of the angle at which the rollers may be placed. However as the fingers are elevated and pressure on the shrimp released, the shrimp may advance unhampered by the fingers. The shape of the cams 67 may be selected for the purpose of varying the time interval during which shrimp are held by the fingers.

In the upper section with the small insert rollers the nips or crotches between the rollers form a relatively large angle of attack for the unwrapping action heretofore described, while in the lower section due to the large diameters of both rollers a more gradual or smaller angle of attack is presented to the shrimp.

Moreover, an entirely new action arises from the use of the pressure fingers in that the lower surfaces of these pressure fingers are non-rotary and are opposed to the rotary surfaces of the power rollers 26 in the upper section and the base rollers 37 in the lower section. When the fingers are in the down position the shrimp tend to be held stationary as to their upper portions in contact with the fingers and tend to be rotated as to their lower portions which are in contact with the moving rollers, with the result that the shell is locally caused to be displaced and dislocated and to slide off the meat. This is one action to which the shrimp is subjected in both sections. The second action is the unraveling or unwrapping action which takes place in the upper section, and a third action is the pinching action which takes place in the lower section.

The lower finger frame 69 has one or more collars 115 projecting from each side thereof slidable on vertical standards or rods 116 affixed to the frame 20 of the machine. Coil springs 117 are wound about the standards 116 between the collars 115 and nuts 118 threaded on upper threaded portions of the rods 116. The nuts 118 are conveniently rotated by handles 119 in order to adjust the tension or load of the springs 117. These springs 117 function to keep the rollers or cam followers 68 pressed downwardly by variable spring pressure upon the peripheries of the cams 67. These springs 117 also function as compensating devices to enable the lower frame section 69 to be raised relatively to the cams 67 in case foreign matter or an unusual accumulation of shrimp should interpose between the fingers and the rollers to prevent the normal descent of the finger frames. These springs 117 also permit a limited tilting yieldable movement in the lower frames 69.

Although in the single embodiment of the invention shown in the drawings only a single finger frame common to the two peeling sections of the machine is illustrated, it will be understood that two such frames, one above each peeling section, may be provided with its own set of operating cams.

Referring more particularly to Figure 15, a power roller 26 of a solid metal or other suitable material having a rubber covering 120 of a quarter-inch or other thickness and with a gear 45 integral therewith is mounted at both ends, as shown upon stub shafts 121 carried by the frame member, such as the back wall 21, by hard bronze or other bushings 122. The stub shafts 121 project into recesses 123 made in the end portions of the rollers 26, in which recesses are also fixed mounted graphited bronze bearings 124 for rotating about the fixed stub shafts 121.

Locking pins 125 slidably mounted through brackets 126 on the frame members 21 are adapted to pass through registering openings in the bushings 122 and the stub shafts 121 to lock the shafts 121 against rotation and axial sliding movement which would remove same from the recesses 123 except when the locking pins 125 are withdrawn the stub shafts 121 may be pulled axially out of bearings 122 in the framework.

Nuts 127 are threaded upon the outer threaded portions of the stub shafts 121 and take against the outer ends of the bushings 122. These nuts are used to draw the shafts 121 through the bushings 122 thereby locking pin by shear in holes through bushing and shaft. The nuts may be locked in place by cotter pins 128 which pass through registering openings in the nuts 127 and in the stub shaft 121.

While we have disclosed herein the best form of the invention known to us at the present time, we desire it to be understood that we reserve the right to make changes and modifications in the herein described embodiment of the invention provided such changes fall within the scope of the following claims.

What is claimed is:

1. In a machine for peeling shrimp, a channel through which the shrimp are adapted to move comprising a base roller and two spaced channel rollers above and in contact with opposite side portions of the base roller to provide a nip running longitudinally at each side of the channel, and means on the machine to impart an oscillatory motion to the base roller to move the shrimp in the channel from one side nip to the other.

2. A machine for peeling shrimp as claimed in claim 1 characterized by the fact that means operatively associated with said rollers are provided to advance the shrimp longitudinally of the rollers down the channel.

3. A machine for peeling shrimp as claimed in claim 1 characterized by the fact that the rollers are longitudinally slanted to cause gravitational feeding of the shrimp down the channel aided by the oscillation of the base roller.

4. A machine for peeling shrimp as claimed in claim 1 wherein pressure fingers are movably mounted in said channel in position to hold the shrimp against the rollers and at the nips, a finger carrying frame mounted to reciprocate vertically on the machine above said channel, and means for imparting reciprocating motion to said frame.

5. A machine for peeling shrimp as claimed in claim 4 in which said means comprises rotary cams on the machine, and cam followers carried by said finger frame and resting on said cams.

6. A machine for peeling shrimp and the like comprising an association of three rollers with their axes parallel and disposed in an inverted triangular arrangement to form a channel through which the shrimp are adapted to move, one roller being a base roller and forming a bottom for the channel, the other two rollers spaced apart horizontally to form sides of the channel and being in frictional contact with the base roller at opposite side portions thereof forming horizontally spaced nips one at each side of the channel, means on the machine to oscillate one of the rollers and through the frictional nips the other rollers in relatively opposite directions, and pressure means in the channel positioned relatively to the rollers to urge the shrimp towards the nips.

7. A machine for peeling shrimp and the like according to claim 6 characterized by the fact that said pressure means comprises a finger carrying frame mounted to reciprocate in the machine above said rollers, and pressure fingers resiliently mounted in said finger frame and positioned to move toward and from the nips of the rollers.

8. A machine for peeling shrimp and the like as claimed in claim 6 in which said pressure means comprises a finger carrying frame mounted to reciprocate in the machine above said rollers, pressure fingers movably mounted in said finger frame and positioned to move toward and from the nips of the rollers, springs in said frame connected to said pressure fingers to yieldably urge said fingers toward the nips of the rollers, and adjusting means in said frame coupled to said springs for varying the resilient tension of the springs with respect to said fingers.

9. In a machine for peeling shrimp, a channel through which the shrimp are adapted to move comprising a base roller, two spaced channel rollers above and to opposite sides of said base roller, and a pair of insert rollers of smaller diameter than said base and channel rollers, one insert roller interposed between the base roller and each of said channel rollers and in frictional contact with the peripheries of the respective base and channel rollers and providing nips at opposite sides of the channel, and means on the machine for imparting an oscillatory motion to the base roller to move the shrimp in the channel alternately from the nips at one side to those of the opposite side.

10. A machine for peeling shrimp and the like as claimed in claim 9 further comprising spring-pressed fingers in said channel positioned relatively to the rollers to urge the shrimp into said nips, said fingers having portions curved to conform generally to the curvature of said base roller and cut-away lower corner portions to accommodate said insert rollers.

11. A machine for peeling shrimp and the like as claimed in claim 9 further comprising means for introducing shrimp to one end of the channel, a receptacle for receiving the peeled meat from the other end of the channel, and a second receptacle beneath the channel for receiving the shells drawn through the nips of the rollers.

12. A machine for peeling shrimp and the like as claimed in claim 9 further comprising means for directing a spray of water in a longitudinal direction into the channel for washing the surfaces of the rollers and advancing the shrimp along the channel.

13. A machine for peeling shrimp and the like composed of first and second sections, said first section comprising an association of five rollers with their axes parallel and disposed in an inverted triangular arrangement to form a channel through which the shrimp are adapted to move, one roller being a base roller and forming a bottom for the channel, two other channel rollers spaced apart horizontally to form in part sides of the channel, and two insert rollers of smaller diameter than said base and channel rollers interposed between and frictionally contacting the base and channel rollers, one at each side of the channel and providing nips at opposite sides of the channel having relatively large angles of attack for an unwrapping action of the hulls from the shrimp, said second section comprising a base roller and two spaced channel rollers above and in contact with opposite side portions of the base roller to provide a channel communicating with the channel of the first section and nips running longitudinally of the last named channel, said rollers of the second section being all of relatively large diameter to provide a smaller angle of attack to the shrimp to create a pinching action, and means for oscillating the rollers of both sections.

14. A machine for peeling shrinp or the like as claimed in claim 13 characterized by the fact that the base rollers of the first section are continued through the second section and form the channel rollers of said second section and constitute power rollers for both sections, said means for oscillating the rollers for both sections being applied initially to said power rollers.

15. A machine for peeling shrimp or the like as claimed in claim 13 further comprising means for delivering the raw shrimp to the channel of the first section, means for directing a liquid stream into the channels in a direction away from the shrimp delivery means for washing the shrimp along the channel, and means for separately collecting the meat and their separated hulls.

16. A machine for peeling shrimp and the like as claimed in claim 13 further comprising means for directing liquid streams against the under sides of said rollers to remove slime and adherent particles of hulls.

17. A machine for peeling shrimp and the like as claimed in claim 13 further comprising reciprocating fingers mounted to move up and down in each of the channels and positioned relatively to the rollers to apply pressure to the shrimp tending to hold the shrimp for more easy grasping in the nips between the rollers.

18. A machine for peeling shrimp and the like as claimed in claim 13 further comprising pressure fingers in the channels positioned relatively to the rollers to urge the shrimp toward the nips of the rollers, and means to raise the fingers out of pressure contact with the shrimp when the rollers come to a stop and until reverse roller rotation has carried the shrimp over to the other side of the channel.

19. In a machine for peeling shrimp, a container through which the shrimp are adapted to move comprising a base roller and two spaced channel rollers above and in contact with opposite side portions of said base roller to provide a nip running longitudinally at each side of the channel, means on the machine to impart an oscillatory motion to the base roller to move the shrimp in the channel from one side nip to the other, pressure fingers movably mounted in the channel and spaced relatively to the rollers to urge the shrimp into the nips thereof, and means for reciprocating said fingers toward and from the rollers in timed relation to the oscillating motion of the rollers in such cycle that the fingers are kept raised until reverse roller rotation has carried the shrimp over to the other side of the channel.

FERNAND S. LAPEYRE.
JAMES M. LAPEYRE, III.
EMILE M. LAPEYRE.

REFERENCES CITED

The following references are of record in the file of this patent:

UNITED STATES PATENTS

| Number | Name | Date |
| --- | --- | --- |
| 1,415,296 | Barry | May 9, 1922 |
| 2,429,828 | Lapeyre et al. | Oct. 28, 1947 |

FOREIGN PATENTS

| Number | Country | Date |
| --- | --- | --- |
| 27,351 | Norway | Oct. 16, 1916 |